United States Patent
Kielwein et al.

[11] Patent Number: 6,045,194
[45] Date of Patent: Apr. 4, 2000

[54] BELT RETRACTOR FOR INCORPORATING IN A FOLD-DOWN TYPE BACKREST

[75] Inventors: Thomas Kielwein, Eschach; Jürgen Rink, Waldstetten, both of Germany

[73] Assignee: TRW Occupant Restraint Systems GmbH & Co. KG, Alfdorf, Germany

[21] Appl. No.: 09/196,006

[22] Filed: Nov. 19, 1998

[30]   Foreign Application Priority Data

Nov. 24, 1997  [DE]  Germany ............ 297 20 817

[51] Int. Cl.[7] .................................. B60R 21/00
[52] U.S. Cl. ........................... 297/476; 297/479
[58] Field of Search ...................... 297/478, 476, 297/475, 480, 474, 479, 378.1, 378.11, 378.12, 378.13; 280/806, 807, 808; 242/383.2, 383.4, 383.5, 384

[56]       References Cited

U.S. PATENT DOCUMENTS 3,915,402  10/1975  Takada .

FOREIGN PATENT DOCUMENTS

| 0700811 | 3/1996 | European Pat. Off. . |
|---|---|---|
| 2927159 | 2/1981 | Germany . |
| 94027676 | 5/1994 | Germany . |
| 2286624 | 8/1995 | United Kingdom . |

*Primary Examiner*—Milton Nelson, Jr.
*Attorney, Agent, or Firm*—Tarolli, Sundheim, Covell, Tummino & Szabo L.L.P.

[57]       ABSTRACT

A belt retractor for incorporation in a fold-down type backrest of a vehicle seat is disclosed. The backrest of the seat is able of being latched to a vehicle body in an upright seating position by a lock. The retractor has a frame and a belt reel rotatably mounted in the frame. A blocking mechanism is provided for selectively blocking rotation of the belt reel on the frame. The blocking mechanism is activated as long as the backrest is not locked in place by latching action of the lock. The blocking mechanism comprises a spring-loaded actuating element coupled to the lock by a traction cable.

3 Claims, 1 Drawing Sheet

BELT RETRACTOR FOR INCORPORATING IN A FOLD-DOWN TYPE BACKREST

FIELD OF INVENTION

The invention relates to a belt retractor for incorporating in a fold-down type backrest which can be latched to the vehicle body in the upright seating position by a lock, including a belt reel rotatably mounted in a frame and a blocking mechanism for selectively blocking rotation of the belt reel on the frame.

When the belt retractor is not secured directly to the vehicle body but to a backrest the belt forces are introduced into the vehicle body via the backrest and its anchorage. A fold-down type backrest needs to be latched to the vehicle body so that it can take the belt forces and transfer them into the vehicle body. Latching a fold-down type backrest to the vehicle body is done by means of a lock which automatically locks in place on attaining the upright seating position of the backrest.

SUMMARY OF THE INVENTION

Since the seat belt is unable to satisfy its restraint function when the lock has failed to fully latch in place the invention proposes activating the blocking mechanism of the belt retractor as long as the backrest is not locked in place by latching action of the lock. When the blocking mechanism is activated, no belt webbing can be withdrawn from the belt retractor. The seat belt can thus not be fastened as long as the backrest is not latched to the vehicle body, thus making it impossible for the seat belt to be fastened without it providing its restraint capability.

In the preferred embodiment the blocking mechanism of the belt retractor is provided with a spring-loaded actuating element coupled to the lock by a traction means. This spring-loaded actuating element, for example an actuating finger urged forward by a compression spring, is operatively coupled to the latch bolt by, for example, a cable pull in such a way that when the lock is latched the actuating element is retracted to release the blocking mechanism, whereas when the lock is not latched in place the actuating element is caused by spring force to engage the actuating arm of the blocking mechanism to move it into the blocking position.

Embodiments of belt retractors are known in which the blocking mechanism comprises two web-coupled ratchet pawls swivably mounted on the frame. In one such embodiment an actuating arm is formed on the web joining the ratchet pawls, the actuating element acting directly on the actuating arm. Retrofitting an existing, proven belt retractor in accordance with the invention is facilitated by affixing to the frame a bracket in which the actuating element preferably configured as an actuating finger is mounted axially shiftable and is supported by a compression spring which biases the actuating finger towards the actuating arm.

BRIEF DESCRIPTION OF THE DRAWINGS

Further features and advantages of the invention are evident from the following description of one embodiment of the invention and from the drawing to which reference is made and in which.

DESCRIPTION OF THE SPECIFIC EMBODIMENT

Figure 1:
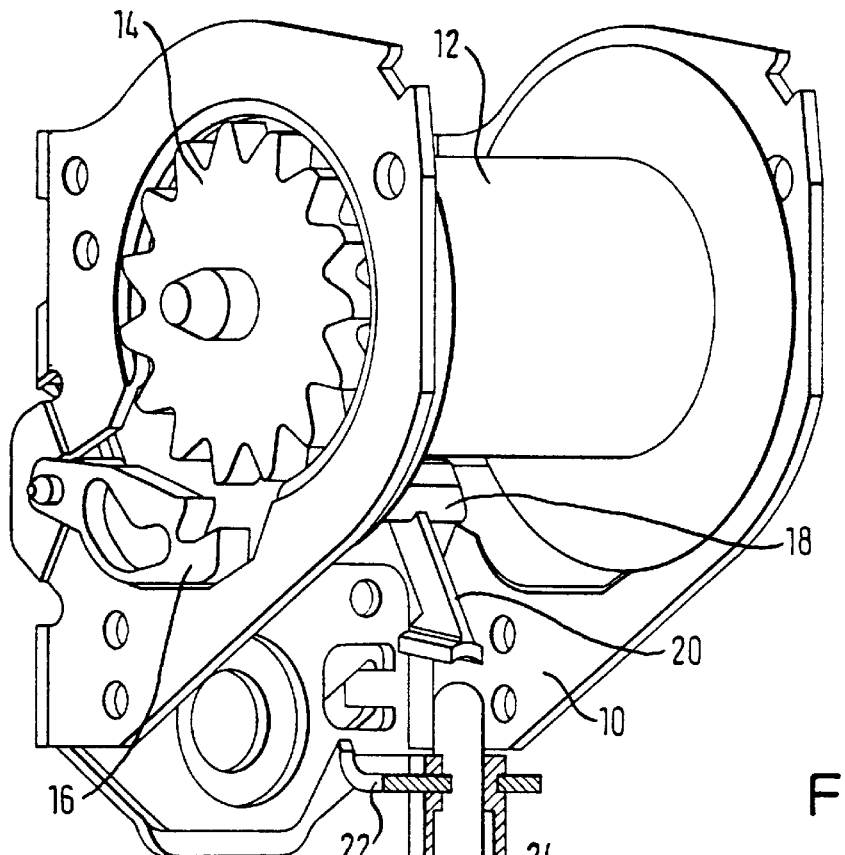
FIG. 1 is a schematic perspective view of a belt retractor of which only the parts essential to the invention are shown.

The belt retractor illustrated in the drawing comprises a load-bearing frame 10 designed for being secured to a fold-down type backrest of the vehicle. Rotatively mounted in the frame 10 is a belt reel 12. As evident from FIG. 1 the side mounting plates of the belt retractor are removed to expose a blocking mechanism consisting of ratchet wheels 14 affixed to the outer surface of the flanges of the belt reel 12 and of two ratchet pawls 16 connected to each other by a web 18. This blocking mechanism is controlled by a vehicle-sensitive and webbing-sensitive activating system (not shown).

Formed on the web 18 joining the ratchet pawls 16 is an actuating arm 20. Furthermore, secured to the frame 10 is a bracket 22 on which an actuating finger 24 is guided and held axially shiftable. Supported by the bracket 22 is a compression spring 26 which biases the actuating finger 24 towards the actuating arm 20. A traction cable 28 is connected to the actuating finger 24 connecting it to a function part of the lock (not shown) by means of which the backrest to which the belt retractor is secured is latched to the vehicle body. This function part of the lock may be, for example, the latch bolt.

In the position shown in FIG. 1 the actuating finger 24 is retracted by the traction cable 28 against the force of the compression spring 26. In this position the actuating finger 24 releases the actuating arm 20 so that the ratchet pawls 16 are controlled only by the vehicle-sensitive and webbing-sensitive activating system of the blocking mechanism.

Figure 2:
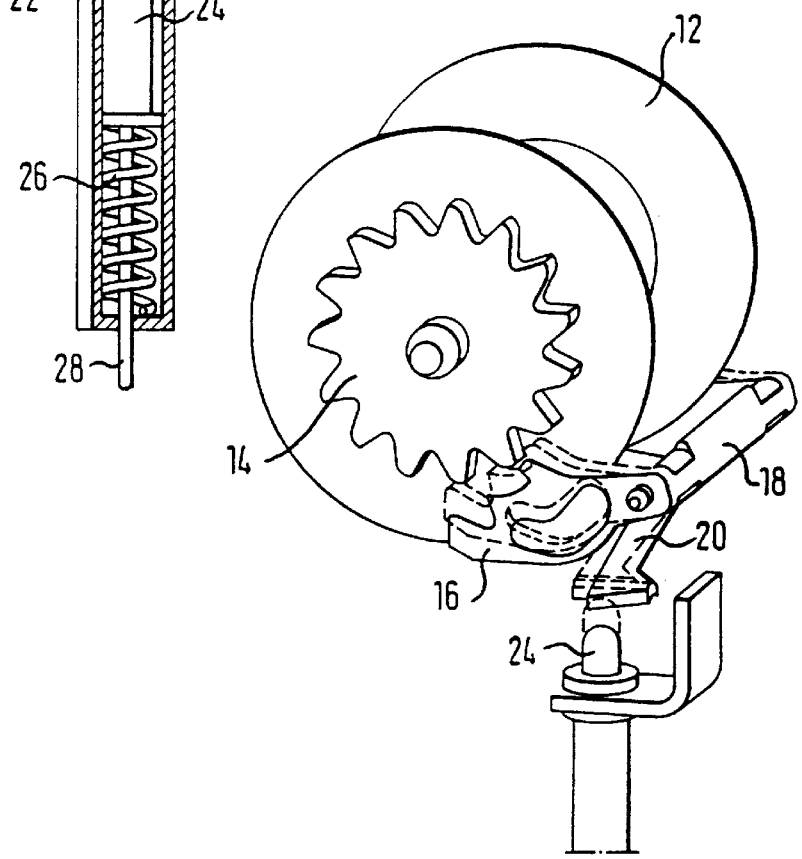
FIG. 2 is a schematic perspective view illustrating the function of the belt retractor.

If, however, the lock, by means of which the backrest is latched to the vehicle body, is not or not fully latched in place no tension is exerted via the traction cable 28 on the actuating finger 24 so that the latter is pushed forward by the compression spring 26 against the actuating arm 20. This action is depicted by the dashed line in FIG. 2. Via the actuating finger 24 and the actuating arm 20, the ratchet pawls 16 are moved into engagement with the ratchet wheels 14 so that the belt reel 12 is blocked and no belt webbing can be withdrawn. In this condition the seat belt cannot be fastened. The vehicle occupant must first allow the lock on the backrest to latch so that the blocking mechanism of the belt retractor is released and the seat belt can be fastened.

What is claimed is:

1. A belt retractor for incorporation in a fold-down type backrest of a vehicle seat, which can be latched to a vehicle body in an upright seating position by a lock, said retractor including a frame, a belt reel rotatably mounted in said frame, and a blocking mechanism coupled to said belt reel for selectively blocking rotation of said belt reel on said frame, said blocking mechanism being activated as long as said backrest is not locked in the upright seating position by latching action of the lock, said blocking mechanism comprising a spring-loaded actuating element coupled to the lock by a traction means, a pair of locking pawls coupled by a web, said locking pawls being pivotally mounted on said frame, an actuating arm affixed to said web, and an actuating finger coupled to the lock by said traction means, said actuating finger being loaded by a compression spring, and said actuating finger acting on said actuating arm.

2. The belt retractor as set forth in claim 1, wherein said actuating finger is shiftably mounted on a bracket secured to said frame.

3. The belt retractor as set forth in claim 2, wherein said compression spring is supported by said bracket.

* * * * *